(12) United States Patent
Shah et al.

(10) Patent No.: US 7,212,527 B2
(45) Date of Patent: May 1, 2007

(54) METHOD AND APPARATUS FOR COMMUNICATING USING LABELED DATA PACKETS IN A NETWORK

(75) Inventors: Hemal V. Shah, Hillsboro, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 09/852,433

(22) Filed: May 9, 2001

(65) Prior Publication Data

US 2002/0191600 A1 Dec. 19, 2002

(51) Int. Cl.
*H04L 12/56* (2006.01)

(52) U.S. Cl. .................................... 370/389

(58) Field of Classification Search ............... 370/389, 370/392, 395.3, 395.32, 400, 401, 471, 474, 370/475; 709/201, 203, 217, 227, 228
See application file for complete search history.

(56) References Cited

U.S. PATENT DOCUMENTS

| | | | | |
|---|---|---|---|---|
| 5,774,660 | A * | 6/1998 | Brendel et al. | 709/201 |
| 6,625,612 | B1 * | 9/2003 | Tal et al. | 707/102 |
| 6,772,333 | B1 * | 8/2004 | Brendel | 709/227 |
| 2001/0039586 | A1 * | 11/2001 | Primak et al. | 709/228 |
| 2002/0007415 | A1 * | 1/2002 | Douglis et al. | 709/230 |
| 2002/0062372 | A1 * | 5/2002 | Hong et al. | 709/225 |
| 2002/0124074 | A1 * | 9/2002 | Levy et al. | 709/224 |
| 2005/0261985 | A1 * | 11/2005 | Miller et al. | 705/26 |

OTHER PUBLICATIONS

"Chapter 1: TCP Queue Identification Option", InfiniBand™ Architecture Release 0.1, IB vol. 1 Specification—Proposed Annex, InfiniBand℠ Trade Association, pp. 7-11, Jan. 18, 2001.

Shah, et al, "CSP: A Novel System Architecture for Scalable Internet and Communication Services", Intel Corporation, Hillsboro, OR. USA.

* cited by examiner

*Primary Examiner*—Chi Pham
*Assistant Examiner*—Anh-Vu Ly
(74) *Attorney, Agent, or Firm*—Blakely, Sokoloff, Taylor & Zafman LLP

(57) ABSTRACT

A method and apparatus for transmitting data packets between a client and a server comprising, a network node receiving a data packet from a client; determining whether an identity (hereafter session id) exists for a communication session with the client. The network node transmits the data packet to a server if no session id exists. The server generates the session id, and transmits the session id to the network node. The network node transmits subsequent data packets received from the client to the server along with the session id. The server transmits subsequent data packets to the network node along with the session id. The network node removes at least the session id prior to transmitting the data packets to the client.

30 Claims, 7 Drawing Sheets

| Source IP ⟵252 | Source TCP Port ⟵254 | Dest IP ⟵256 | Dest TCP Port ⟵258 | Phy Src Port ⟵260 | Phy Dest Port ⟵262 |
|---|---|---|---|---|---|
| | | | | | |
| | | | | | |
| | | | | | |

Figure 2 (Prior art)
250

METHOD AND APPARATUS FOR COMMUNICATING USING LABELED DATA PACKETS IN A NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field of the Invention

The present invention is related to the field of networking. In particular, the present invention is related to a method and apparatus for communicating using labeled data packets in a network.

2. Description of the Related Art

Due to the growth of networks, scalable and reliable network services that use low latency high bandwidth system area networks (SANs) are being deployed in data centers. FIG. 1 illustrates a network architecture 100 wherein a network 150 such as a local area network (LAN), a wide area network (WAN) or the Internet is connected to a SAN 160 that includes one or more network nodes 140a–140n connected to one or more application servers 120a–120n. Typically, application servers host network services, and communicate with network clients, e.g., client 152, through network nodes using Transmission Control Protocol/Internet Protocol (TCP/IP). Please see Request For Comment (RFC) 793 titled "Transmission Control Protocol DARPA Internet Program Protocol Specification" for details on TCP. Also, please see RFC 791 titled "Internet Protocol DARPA Internet Program Protocol Specification" for details on IP. For each communication session, when a packet, for example, a TCP/IP packet such as a request for information from client 152 on the Internet arrives at a network node, e.g., 140a, address information such as the source IP address, the source TCP port number, the destination IP address and the destination TCP port number is obtained from the packet, and either entered (in the case of a new communication), or searched (in the case of an existing communication) in a forwarding table 250 as illustrated in FIG. 2. The packet may be transmitted to its destination, for example, an application server 120a using the physical address of the destination port.

When the packet arrives at application server 120a, for a particular communication session, address information such as the source IP address, the source TCP port number, the destination IP address and the destination port number is obtained from the packet and either entered or searched in a table similar to the one indicated in FIG. 2. The application server 120a may retrieve the requested information for client 152, and transmit the packet containing the requested information back to network node 140a.

When the packet with the requested information arrives at the network node 140a, the network node obtains address information from the packet and searches the forwarding table on the network node for the physical port through which the packet is to be forwarded to client 152. Thus, for each packet received from a client for a particular communication session, a search for address information is performed at the network node, at the application server, and again at the network node prior to transmitting the packet back to the client requesting the information. This redundant searching for session information for each packet is inefficient and time consuming.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

FIG. 2 illustrates a prior art table of forwarding address information.

DETAILED DESCRIPTION

Figure 1:
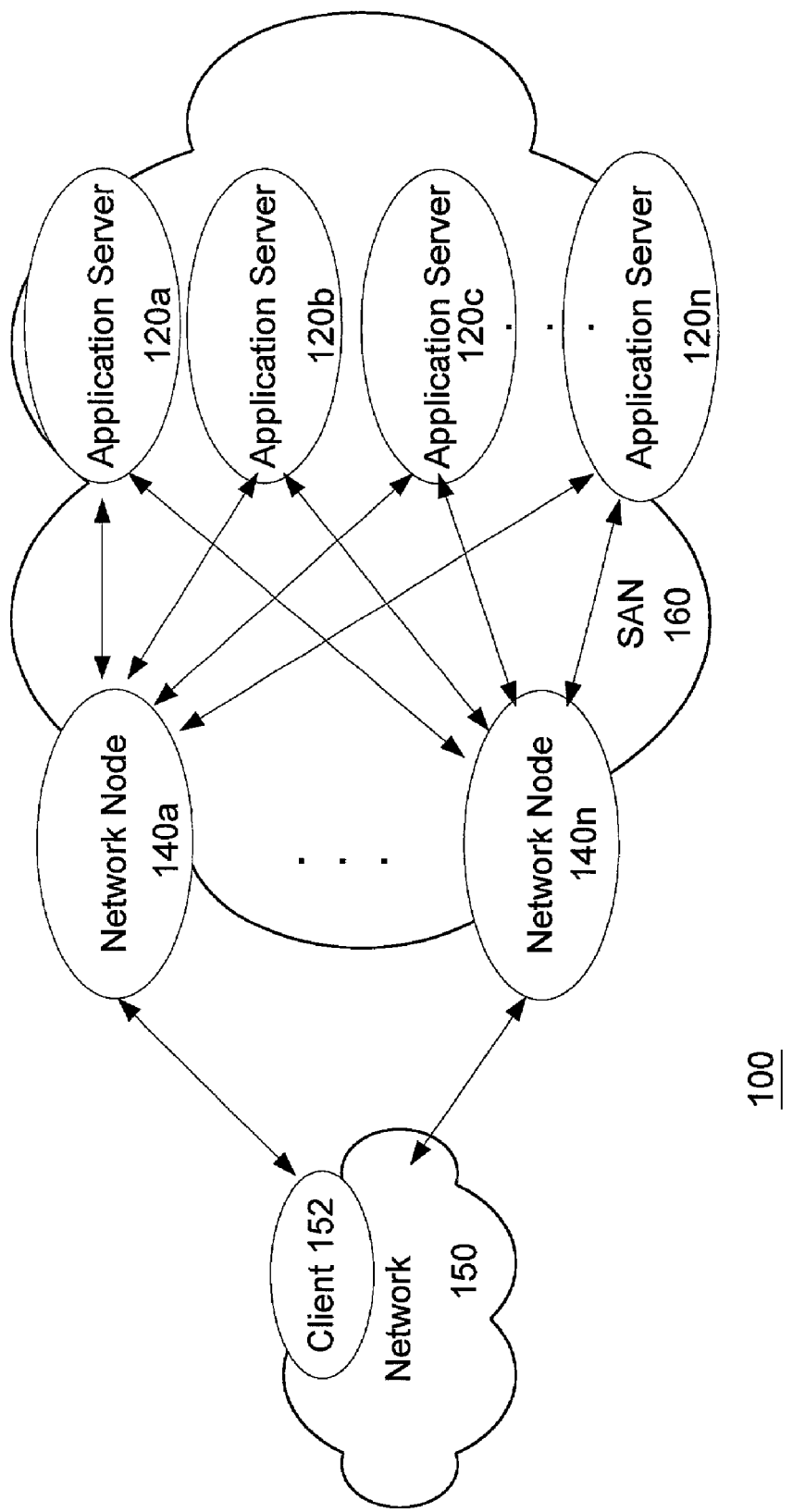
FIG. 1 illustrates a prior art embodiment of a data center architecture.

Described is a method and apparatus for communicating using labeled data packets in a network. The method and apparatus disclosed uses a session identity encapsulated in a flow header during each communication session. In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description that follows is represented largely in terms of processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. Each of these conventional distributed computing components is accessible to the local processing unit by a communication network.

In addition, it should be understood that the programs, processes, method, etc. described herein are not related or limited to any particular computer or apparatus nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in a nonvolatile memory such as read only memory.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

In one embodiment, the invention comprises a method and apparatus for identifying communication sessions by labeling packets, e.g., TCP/IP packets, between a network node and an application server. Although the invention is described using TCP/IP packets, one skilled in the art will appreciate that packets using other protocols may also be used. When a packet, e.g., a data packet is received at a network node from a client connected to, for example, the Internet, a determination is made whether a session identity exists for a communication session with the client. If no session identity exists, the packet is forwarded to a destination, e.g., an application server. A session identity is received from the destination, and subsequent packets received from the client are transmitted along with the session identity to the destination.

In one embodiment, when the application server receives the packet, the application server determines whether a session identity exists for a communication session with the client. The application server generates a session identity if no session identity exists, and transmits the session identity to the network node. Communications between a network node and an application server are encapsulated, for example, within SAN packets. A SAN packet may contain a SAN header and payload data.

Figure 3:
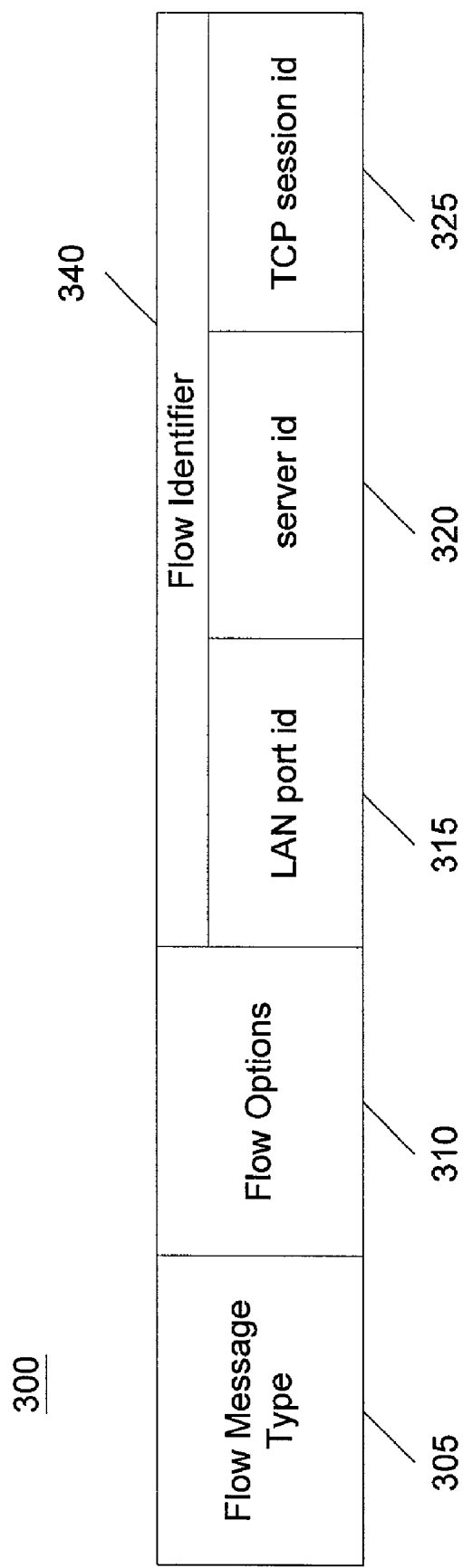
FIG. 3 illustrates a header used for forwarding data packets in accordance with one embodiment of the invention.

The session identity described above is included in a flow header that may be a part of the SAN header. A flow may be defined as a particular communication session between a network client and an application server. FIG. 3 illustrates one embodiment of a flow header of the encapsulated SAN packet. Although the embodiment illustrated in FIG. 3 shows a flow header with three fields, i.e., a flow message type field 305, a flow options field 310, and a flow identifier field 340, other embodiments may include a flow header with more or even less than three fields.

The flow message type field 305 is used to convey information regarding the status of the encapsulated data packet, or information regarding operations to be performed on the encapsulated data packets. Table 1 lists a few examples of messages that may be contained in the flow message type field 305.

TABLE 1

| Flow Message Type | Description |
| --- | --- |
| no_flow | Encapsulated data packet is not associated with a known TCP flow (no flow identifier). |
| existing_flow | Encapsulated data packet is associated with known TCP flow (has a flow identifier). |
| new_flow | Encapsulated data packet is associated with a new TCP flow. Receiving node to log address/flow information. |
| terminate_flow | Encapsulated data packet is the final packet of a TCP flow. Receiving node to remove flow information. |
| terminate_flow_on_ack | Encapsulated data packet is to be forwarded and the next TCP ACK received from the Internet client is the final packet in the flow. |
| delete_flow | A particular TCP flow should be deleted from the forwarding table. |

The flow options field 310 of flow header 300 is used to identify options associated with a specific flow. In one embodiment, a compressed packet flow option is used to indicate that the encapsulated data packets are in a compressed format. In the compressed format at least a portion of the TCP and IP header information of the received packet may not be included in communications between a network node and an application server. For example, if the destination server is an application server, the application server's media access control (MAC) address, IP address, and TCP port number, and the client's IP address, and TCP port number may not be included in the compressed data packet. By not transmitting address information contained in the TCP and IP headers with each data packet, the payload data in the SAN packet may be increased. In other embodiments, checksum flags may be included in the flow option field to indicate whether checksums, for example TCP and IP checksums should be performed on the information contained in encapsulated data packet.

In one embodiment, flow identifier 340 in flow header 300 comprises at least three fields that may be generated when the TCP connections are initially established. As illustrated in FIG. 3, flow identifier 340 comprises the LAN port id field 315, the server id field 320, and the TCP session id field 325.

Figure 4A:
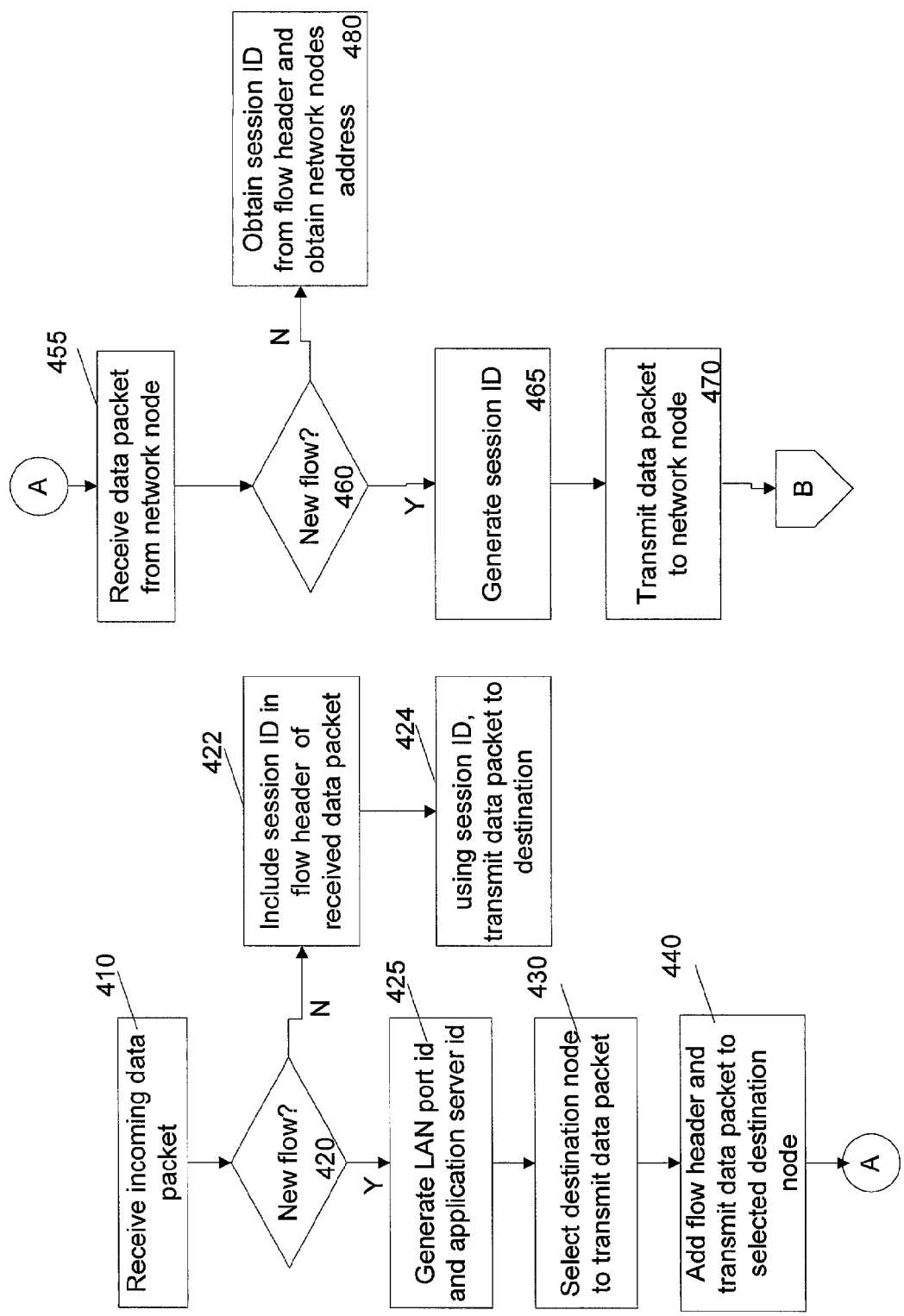
FIG. 4 illustrates a flow diagram for labeling data packets in a network in accordance with one embodiment of the invention.
FIG. 4B illustrates a continuation of the flow diagram for forwarding data packets in a network in accordance with one embodiment of the invention.
FIG. 4C illustrates one embodiment wherein a communication session is initiated by an application server.

FIG. 4A is a flow diagram that illustrates the process of receiving a packet from a network client and forwarding the data packet to an application server in a network using a session identifier, e.g., the TCP session identifier field for a particular communication session with the client. At 410, a data packet is received at a network node from a client connected to a network. The network may be a local area network (LAN), a wide area network (WAN), or even the Internet. Usually, at the start of each communication session the first data packet received using the transmission control protocol (TCP) is a TCP synchronizing (TCP SYN) packet. The TCP SYN packet is used to synchronize the two ends of a connection in preparation for opening a connection.

When the TCP SYN packet, sent by a network client, is received at the network node, the network node encapsulates the data packet in a flow header as described earlier. In FIG. 4A at 420, the network node determines whether the packet received is for a new communication session or flow by examining the SYN bit in the TCP packet. If the SYN bit is set to a binary '1', thereby indicating a new flow, the network node forwards the TCP SYN packet generated by the client to an application server. However, prior to forwarding the TCP SYN packet, at 425 the network node initializes the LAN port id field 315 and the server id field 320 in the flow header. In one embodiment, the network node may initialize the LAN port id 315 in flow header to a value that associates the network client with the physical port on which the packet was received.

Each network node may have one or more application servers connected to it. The network node uses the server id 320 to identify a particular application server in the network. The network node initializes the server id to correspond with a SAN channel over which the encapsulated TCP SYN packet is transmitted. In addition to initializing the LAN port id 315 and the server id 320, the network node fills in the flow message type field 305, and the flow options field 310 in flow header 300. The flow message type field 305 is filled with a no_flow label to indicate the encapsulated data packet is not associated with a known TCP flow. If the compressed flow option is used, e.g., in the transmission of subsequent data packets, or if a checksum needs to be performed on the data packet, the flow options field 310 is filled in accordingly. In one embodiment, a flag comprising of one or more binary bits may be used to indicate a corresponding flow option.

In one embodiment, when the TCP SYN packet initiated by a network client is received at the network node, at 430, an application server is selected using a server load balancing algorithm. After the application server is selected, at 440 the TCP SYN packet is encapsulated in the flow header and the encapsulated TCP SYN packet is transmitted to the selected application server.

At 455 the application server receives the encapsulated TCP SYN packet from the network node. At 460, the application server determines whether the received data packet corresponds with a new flow, for example, by reading the flow message type field 305 in the flow header, or by examining the SYN bit in the TCP packet. The application server responds to a TCP SYN packet by generating a TCP SYN/ACK (acknowledgement) packet. In particular, the application server generates a TCP SYN/ACK packet and sets the ACK bit, and the SYN bit in the generated packet to a binary '1'. In addition, at 465 the application server generates a TCP session id 325 and writes the TCP session id 325 in the flow header 300. After the TCP session id is written in flow header 300, the application server labels the flow message type field 305 to new_flow. The application server saves the flow identifier 340 along with other information including logical connection information which maps to the physical address of the network node in a transmission control block (TCB) of the corresponding TCP session.

When subsequent data packets arrive at the application server, the application server obtains the TCP session id from the flow header and uses it to obtain a pointer that points to the TCB corresponding to the particular TCP session. The application server obtains the logical connection information from the TCB to transmit packets back to the network node. At 470, the application server transmits the encapsulated TCP SYN/ACK packet to the network node.

Figures 4B, 4C:
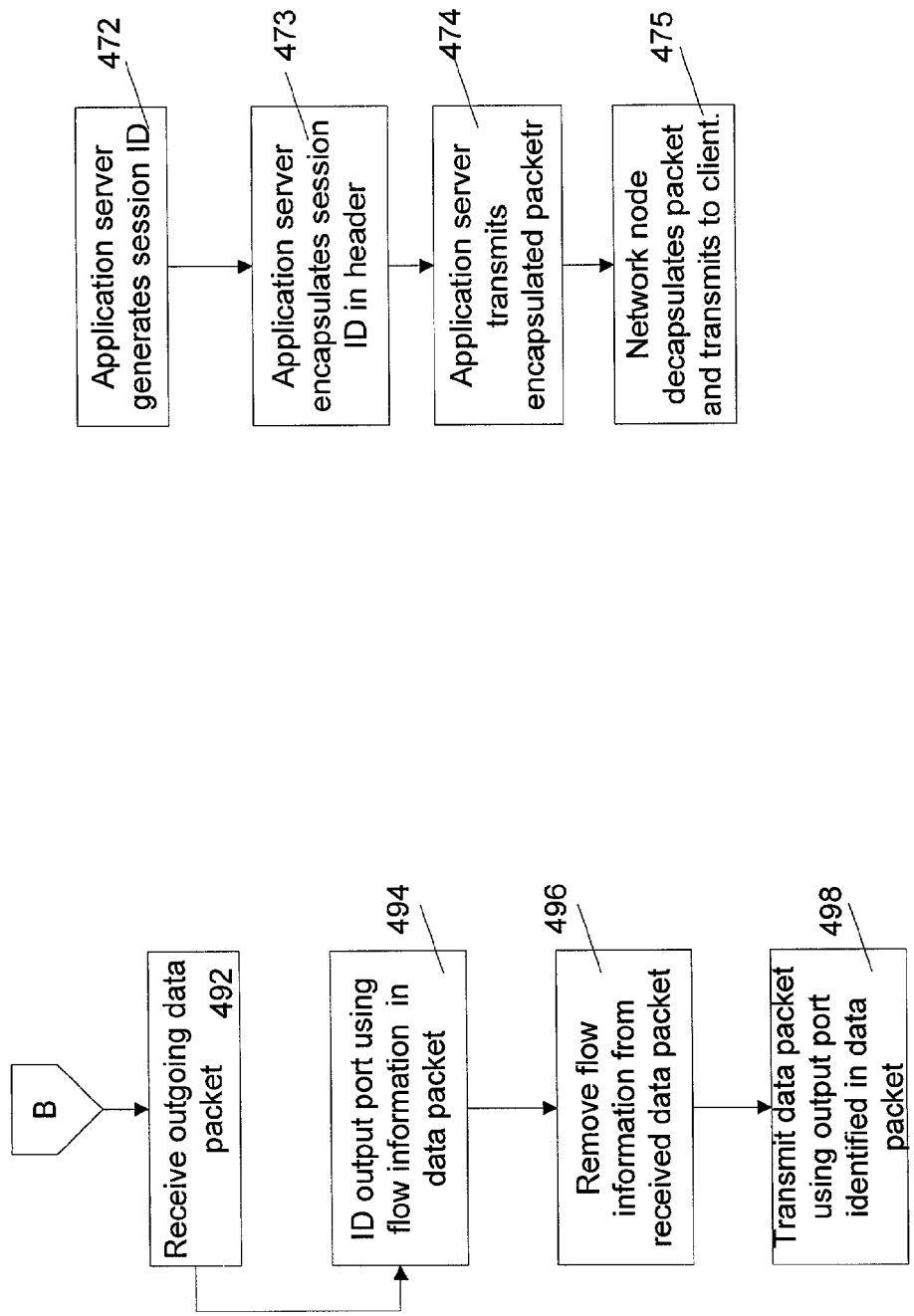
Figure 5:
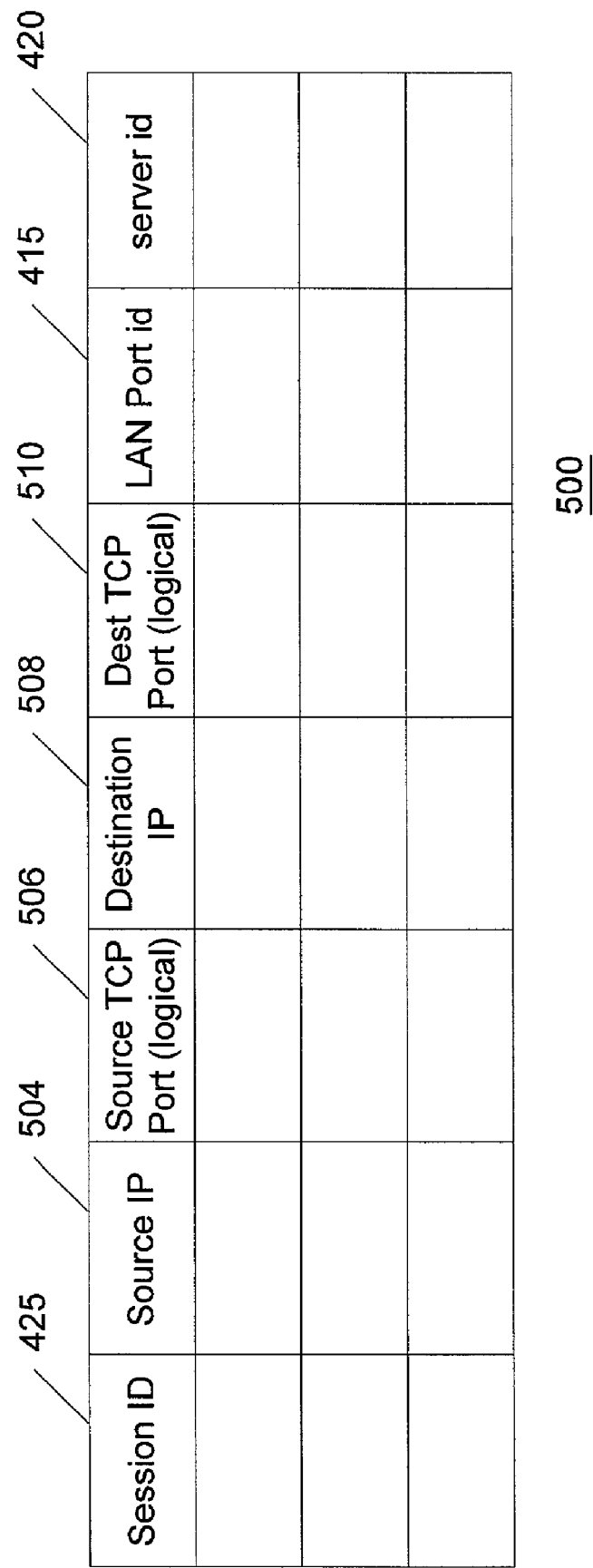
FIG. 5 illustrates a table of forwarding information in accordance with one embodiment of the invention.

Referring to FIG. 4B, at 492, the network node receives the encapsulated TCP SYN/ACK packet from the application server, obtains the TCP session id 325 from the flow header of the encapsulated TCP SYN/ACK packet and enters the TCP session id 325 in forwarding table 500 as illustrated in FIG. 5. The network node writes at least the flow header information and the IP address information of the client and the application server in a forwarding table as illustrated in FIG. 5. At 494, the network node identifies the output port through which the packet is to be transmitted using the LAN port id 315 in the flow header. At 496, the flow header is removed form the packet to form a decapsulated TCP SYN/ACK packet, and at 498 the decapsulated TCP SYN/ACK packet is transmitted to the client via the port identified by the LAN port id 315. The port through which to transmit the packet is obtained directly from the flow header 300, without the network node having to search through a forwarding table.

FIG. 4C illustrates one embodiment wherein a communication session is initiated by an application server. The embodiment illustrated in FIG. 4C is also called an active open or a simultaneous open session. At 472, the application server generates at least a session identifier. At 473, the application server includes the session identifier in the TCP session id field 325 in the flow header, and sets the flow message type field 305 in the flow header to new_flow. At 474, the application server initiates a communication session by transmitting the encapsulated TCP SYN packet to the network node. Upon receiving the encapsulated TCP SYN packet from the application server, at 475, the network node creates an entry in its forwarding table that includes the address information of the network client. The network node decapsulates the packet, removing at least the flow header, and transmits the decapsulated packet to the network client through an appropriate physical interface.

When the next packet, for example, a request for information is received from the client at the network node, at 422 the network node obtains address information such as the source and destination IP addresses and the source and destination TCP port numbers from the packet. The network node uses the obtained address information to search through forwarding table 500 to obtain the flow header information for the received packet. In one embodiment, the network node uses the address information obtained from the packet as input to a hash function to obtain a hash value, and uses the hash value to search through forwarding table 500 to obtain the flow header information. On finding the flow header information in forwarding table 500, at 424 the flow identifier information such as the LAN port id 315, the server id 320 and the TCP session id 325 are inserted in the flow header. In addition, the network node sets the flow message type field 305, to existing_flow, and the flow options field 310 as described earlier. The TCP/IP packet is then encapsulated in a SAN packet with flow header 300 and transmitted to the application server indicated by server id 320.

At 480, the application server obtains the TCP session id 325 from the flow header that encapsulates the packet and uses the TCP session id to obtain a pointer that points to the corresponding TCB. The application server obtains the logical connection information from the TCB to transmit the packet to the network node. Thus, the application server obtains the network client's address information by using the TCP session id 325 without searching through a table using for example, the source and destination IP address information or the source and destination TCP port information. The application server transmits subsequent encapsulated TCP packets to the network node with the flow message type set to existing_flow.

If during the transmission of packets between the network node and the application server the compressed format flow option is selected, prior to transmitting the packet to the client, the original header information is inserted back in the packet by the network node.

In one embodiment, when terminating a communication session, a network client may generate a TCP FIN packet. A TCP FIN packet sets the FIN bit in the packet to a binary '1'. On receiving the TCP FIN packet the network node 140*a* encapsulates the TCP FIN packet in the flow header and forwards the encapsulated TCP FIN packet to the application server with the flow message type field 305 set to existing-flow. The application server transmits an encapsulated TCP FIN/ACK packet to the network node and sets the flow message type field 305 to terminate_flow_on_ack. The network node decapsulates the TCP FIN/ACK packet, removing the flow header, and transmits the TCP packet to the network client. On receiving the TCP ACK packet from the client the network node encapsulates the packet with the flow header and transmits the encapsulated TCP ACK packet to the application server. In one embodiment, prior to transmitting the encapsulated TCP ACK packet to the application server, the network node removes the communication session information from the forwarding table.

However, when an application server initiates a connection teardown, (active close or a simultaneous close) the application server first sends the TCP FIN packet to the network client through the network node using the existing_flow message type. On receiving the TCP FIN/ACK packet from the client the network node encapsulates the TCP FIN/ACK packet in a flow header and forwards the encapsulated TCP FIN/ACK packet to the application server with the flow message type field 305 set to existing_flow. The application server transmits the encapsulated final TCP ACK packet to the network node and sets the flow message type field 305 to terminate_flow. On receiving the final encapsulated TCP ACK packet the network node removes the flow header, transmits the decapsulated final TCP ACK packet to the client, and removes the TCP session information from the forwarding table.

Figure 6:
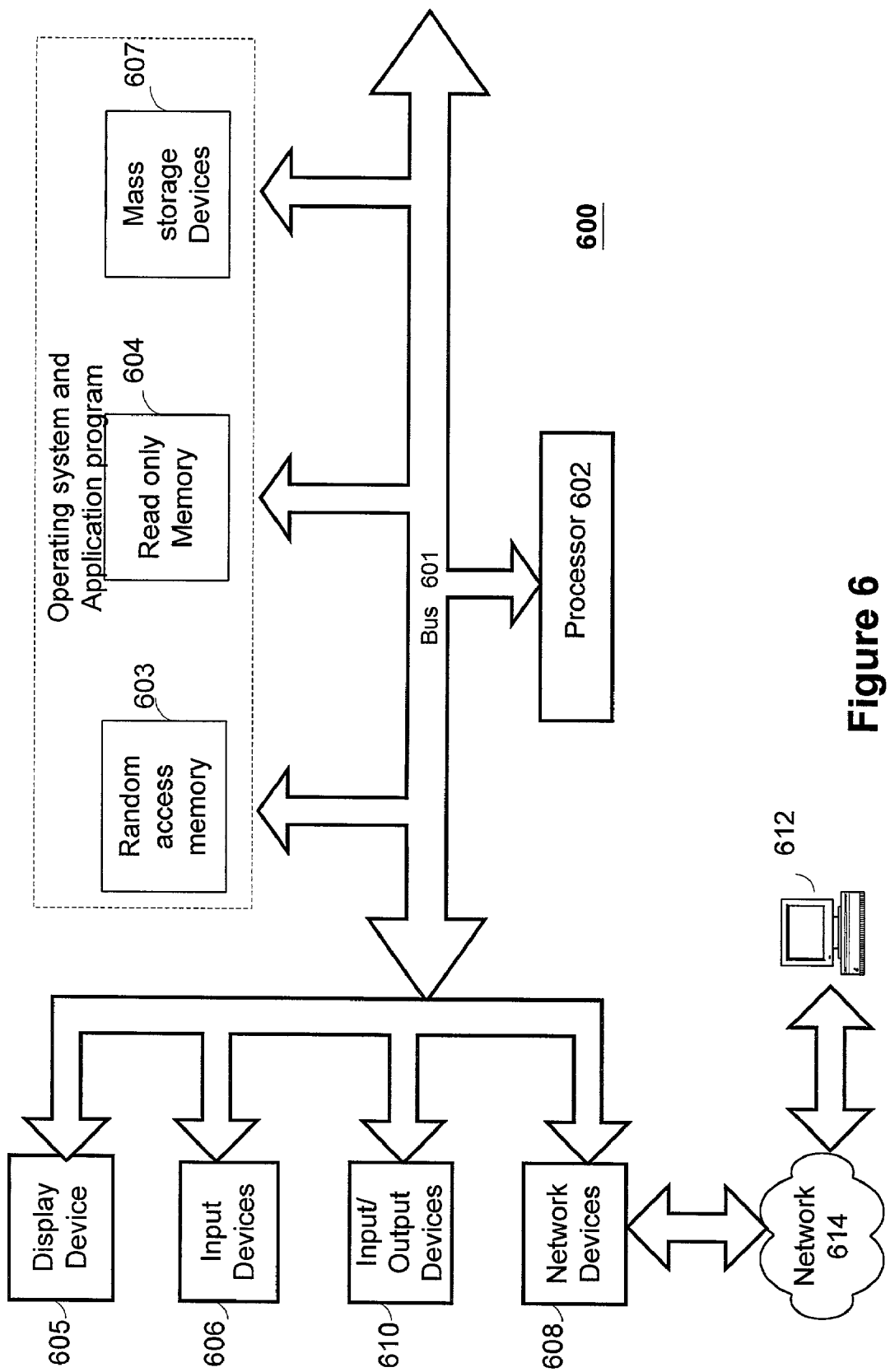
FIG. 6 illustrates an apparatus for forwarding data packets in accordance with one embodiment of the invention.

FIG. 6 illustrates a typical computer system 600 in which the present invention operates. The computer system is used to receive packets from a client on a network, to encapsulate the packets in a flow header, and to transmit a TCP session id received from an application server with each subsequent packet transmitted to the application server. Furthermore, computer system 600 uses the information contained in the flow header to transmit packets to the network client without searching through a forwarding table.

In another embodiment computer system 600 may be used as an application server. In this embodiment computer system 600 receives a packet from a network node encapsulated in a flow header and generates a TCP session id. Computer system 600 writes the TCP session id in the flow header and transmits the packet including the TCP session id to the network node. When subsequent encapsulated packets arrive at computer system 600 from the network node, the TCP session id obtained from the flow header is used to obtain a pointer to the TCB. Computer system 600 obtains logical connection information for a network node from the TCB, and uses the logical connection information to transmit packets to the network node. Computer system 600 may also initiate communications with a network client by generating a session id, encapsulating the session id in a header and transmitting the encapsulated packet to the network client via a network node.

One embodiment of the present invention is implemented on a personal computer (PC) architecture. It will be apparent to those of ordinary skill in the art that alternative computer system architectures or other processor, programmable or electronic-based devices may also be employed.

In general, such computer systems as illustrated by FIG. 6 includes a processor 602 coupled through a bus 601 to a random access memory (RAM) 603, a read only memory (ROM) 604, and a mass storage device 607. Mass storage device 607 represents a persistent data storage device, such as a floppy disk drive, fixed disk drive (e.g., magnetic, optical, magneto-optical, or the like), or streaming tape drive. Processor 602 may be any of a wide variety of general purpose processors or microprocessors (such as the Pentium® processor manufactured by Intel® Corporation), a special purpose processor, or a specifically programmed logic device.

Display device 605 is coupled to processor 602 through bus 601 and provides graphical output for computer system 600. Input devices 606 such as a keyboard or mouse are coupled to bus 601 for communicating information and command selections to processor 602. Also coupled to processor 602 through bus 601 is an input/output interface 610 which can be used to control and transfer data to electronic devices (printers, other computers, etc.) connected to computer 600. Computer system 600 includes network devices 608 for connecting computer system 600 to one or more networks 614. Network devices 608, may include Ethernet devices, phone jacks and satellite links. It will be apparent to one of ordinary skill in the art that other network devices may also be utilized.

One embodiment of the invention may be stored entirely as a software product on mass storage 607. Another embodiment of the invention may be embedded in a hardware product 609, for example, in a printed circuit board, in a special purpose processor, or in a specifically programmed logic device communicatively coupled to bus 601. Still other embodiments of the invention may be implemented partially as a software product and partially as a hardware product.

Embodiments of the invention may be represented as a software product stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. Those of ordinary skill in the art will appreciate that other instructions and operations necessary to implement the described invention may also be stored on the machine-accessible medium.

Thus a method and apparatus have been disclosed for communicating using labeled packets in a network using an identifier for each network session. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
   receiving a data packet from source;
   determining whether a session identity exists for a commmmunication session with the source;

encapsulating the received data packet in a flow header including at least two of a flow message type field, a flow option field, a source port identity field, a destination identity field and a session identity field;
transmitting the flow header with the received data packet to a destination if no session identity exists;
receiving the session identity from the destination using the flow header; and transmitting subsequent data packets received from the source along with the session identity to the destination.

2. The method of claim 1 wherein determining whether a session identity exists for a communication session with the source comprises:
obtaining address information from the data packet; and
searching a table using the address information for the session identity.

3. The method of claim 2 wherein searching a table using the address information for the session identity comprises:
using the address information in a hash function to obtain a hash value; and
using the hash value to find the session identity.

4. The method of claim 1 further comprising:
removing a header prior to transmitting data packets received from the destination to the source; and
using information in the header to transmit data packets received from the destination to the source.

5. The method of claim 4 wherein the information in the header comprises the source port identity.

6. The method of claim 1 wherein transmitting subsequent data packets received from the source along with the session identity to the destination comprises:
adding a header including at least one of a flow message type field, a flow option field, a source port identity field, a destination identity field, and a session identity field; and not transmitting at least part of address information in the received subsequent data packets to the destination.

7. A method comprising:
receiving a data packet from a source through a network node;
determining whether a session identity exists for a communication session with the source;
in response to the data packet, encapsulating another data packet in
a flow header including at least two of a flow message type field, a flow option field, a source port identity field, a destination identity field and a session identity field;
generating a session identity of no session identity exists; and
transmitting the flow header including the encapsulated another data packet to communicate the session identity to the network node.

8. The method of claim 7 wherein determining whether a session identity exists for a communication session with the source comprises:
obtaining the session identity from the data packet if one is included in the data packet;
obtaining address information of the network node; and
transmitting data to the network node using the address information.

9. The method of claim 8 wherein obtaining address information of the network node using the session identity comprises using the session identity as a pointer to the network node's address information.

10. The method of claim 8 wherein transmitting data to the network node using the address information comprises not transmitting at least part of the source's address information in the received data packet.

11. An article of manufacture comprising:
a computer-readable medium including instructions that, when executed by a computer, causes the computer to perform operations comprising:
receiving a data packet from a source;
determining whether a session identity exists for a communication session with the source;
encapsulating the received data packet in a flow header including at least two of a flow message type field, a flow option field, a source port identity field, a destination identity field and a session identity field;
transmitting the flow header with the received data packet to a destination if no session identity exists;
receiving the session identity from the destination using the flow header; and
transmitting subsequent data packets received from the source along with the session identity to the destination.

12. An article of manufacture as in claim 11 wherein instructions for determining whether a session identity exists for a communication session with the source comprises further instructions for:
obtaining address information from the data packet; and
searching a table using the address information for the session identity.

13. An article of manufacture as in claim 12 wherein instructions for searching a table using the address information for the session identity comprises further instructions for
using the address information in a hash function to obtain a hash value; and
using the hash value to find the session identity.

14. An article of manufacture as in claim 11 comprising further instructions for removing a header prior to transmitting data packets received from the destination to the source; and
using information in the header to transmit data packets received from the destination to the source.

15. An article of manufacture as in claim 14 wherein instructions for using information in the header to transmit data packets received from the destination to the source comprises instructions for using the source port identity to transmit data packets received from the destination to the source.

16. An article of manufacture as in claim 11 wherein instructions for transmitting subsequent data packets received from the source along with the session identity to the destination comprises further instructions for adding a header including at least one of a flow message type field, a flow option field, a source port identity field, a destination identity field, and a session identity field; and not transmitting at least part of address information in the received subsequent data packets to the destination.

17. An article of manufacture comprising:
a computer-readable medium including instructions that, when executed by a computer, causes the computer to perform operations comprising:
receiving a data packet from a source through a network node;
determining whether a session identity exists for a communication session with the source;

in response to the received data packet, encapsulating another data packet in a flow header including at least two of a flow message type field, a flow option field, a source port identity field, a destination field and a session identity field;

generating a session identity if no session exists; and transmitting the flow header including the encapsulated another data packet to communicate the session identity to the network node.

18. An article of manufacture as in claim 17 wherein determining whether a session identity exists for a communication session with the source comprises further instructions for:

obtaining the session identity from the data packet if one is included in the data packet;

obtaining address information of the network node; and transmitting data to the network node using the address information.

19. An article of manufacture as in claim 18 wherein obtaining address information of the network node using the session identity comprises further instructions for using the session identity as a pointer to the network node's address information.

20. An article of manufacture as in claim 17 wherein instructions for transmitting data to the network node using the address information comprises further instructions for not transmitting at least part of the source's address information in the received data packet.

21. A computer system comprising:

a bus;

a data storage device coupled to said bus; and a processor coupled to said data storage device, said processor operable to receive instructions which, when executed by the processor, cause the processor to perform a method comprising receiving a data packet from a source;

determining whether a session identity exists for a communication session with the source;

encapsulating the received data packet in a flow header including at least two of a flow message type field, a flow option field, a source port identity field, a destination field and a session identity field;

transmitting the flow header with the received data packet to a destination if no session identity exists;

receiving the session identity from the destination using the flow header; and transmitting subsequent data packets received from the source along with the session identity to the destination.

22. A computer system as in claim 21 wherein determining whether a session identity exists for a communication session with the source comprises:

obtaining address information from the data packet; and searching a table using the address information for the session identity.

23. A computer system as in claim 22 wherein searching a table using the address information for the session identity comprises:

using the address information in a hash function to obtain a hash value; and using the hash value to find the session identity.

24. A computer system as in claim 21 further comprising:

removing a header prior to transmitting data packets received from the destination to the source; and using information in the header to transmit data packets received from the destination to the source.

25. A computer system as in claim 24 wherein the information in the header comprises the source port identity.

26. A computer system as in claim 21 wherein transmitting subsequent data packets received from the source along with the session identity to the destination comprises adding a header including at least one of a flow message type field, a flow option field, a source port identity field, a destination identity field, and a session identity field; and not transmitting at least part of address information in the received subsequent data packets to the destination.

27. A computer system comprising:

a bus;

a data storage device couple to said bus; and a processor couple to said data storage device, said processor operable to receive instructions which, when executed by the processor, cause the processor to perform a method comprising receiving a data packet from a source through a network node;

determining whether a session identity exists for a communication session with the source;

in response to the received data packet, encapsulating another data packet in a flow header including at least two of a flow message type field, a flow option field, a source port identity field, a destination identity field and a session identity field;

generating a session identity if no session identity exists; and transmitting the flow header including the encapsulated another data packet to communicate the session identity to the network node.

28. A computer system as in claim 27 wherein determining whether a session identity exists for a communication session with the source comprises:

obtaining the session identity from the data packet if one is included in the data packet;

obtaining address information of the network node using the session identity; and transmitting data to the network node using the address information.

29. A computer system as in claim 28 wherein obtaining address information of the network node using the session identity comprises using the session identity as a pointer to the network node's address information.

30. A computer system as in claim 28 wherein transmitting data to the network node using the address information comprises not transmitting at least part of the source's address information in the received data packet.

* * * * *

UNITED STATES PATENT AND TRADEMARK OFFICE
CERTIFICATE OF CORRECTION

PATENT NO. : 7,212,527 B2
APPLICATION NO. : 09/852433
DATED : May 1, 2007
INVENTOR(S) : Shah et al.

It is certified that error appears in the above-identified patent and that said Letters Patent is hereby corrected as shown below:

In column 8, at line 65, after "from" insert --a--.

In column 12, at line 22, delete "couple" and insert --coupled--.

Signed and Sealed this

Twenty-fifth Day of December, 2007

JON W. DUDAS
*Director of the United States Patent and Trademark Office*